United States Patent
Subramanian et al.

(10) Patent No.: US 9,130,840 B2
(45) Date of Patent: Sep. 8, 2015

(54) METHOD AND APPARATUS FOR OPTIMIZING MANAGEMENT AND CONFIGURATION OF RADIO FREQUENCY IDENTIFICATION READERS

(75) Inventors: Panchapakesan V. Subramanian, Frederick, MD (US); Michael O'Haire, Smithtown, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 317 days.

(21) Appl. No.: 13/292,789

(22) Filed: Nov. 9, 2011

(65) Prior Publication Data

US 2013/0113608 A1    May 9, 2013

(51) Int. Cl.
    G06K 7/01     (2006.01)
    H04L 12/24    (2006.01)
    H04L 12/18    (2006.01)

(52) U.S. Cl.
    CPC ........... *H04L 41/0823* (2013.01); *H04L 12/185* (2013.01)

(58) Field of Classification Search
    CPC .......................... H04L 12/185; H04L 41/0823
    USPC ............... 340/10.1, 10.3, 10.5, 10.32, 13.26, 340/13.25, 13.24, 572.1, 572.4, 539.21; 455/88
    See application file for complete search history.

(56) References Cited

U.S. PATENT DOCUMENTS

| | | | |
|---|---|---|---|
| 2005/0135410 A1* | 6/2005 | Stephens ....................... | 370/449 |
| 2006/0109084 A1* | 5/2006 | Yarvis .......................... | 340/10.1 |
| 2006/0267730 A1* | 11/2006 | Steinke et al. ............... | 340/10.1 |
| 2007/0046467 A1* | 3/2007 | Chakraborty et al. ..... | 340/572.1 |
| 2007/0109100 A1* | 5/2007 | Jett et al. ...................... | 340/10.4 |
| 2010/0157928 A1* | 6/2010 | Spinar et al. ................. | 370/329 |
| 2011/0074552 A1* | 3/2011 | Norair et al. ................. | 340/10.1 |

OTHER PUBLICATIONS

Cardiel et al, "MARC: Minimum Access RFID Readers Commands", IEEE, Sep. 15-16, 2011.*
PCT International Search Report Dated Apr. 18, 2013 for Counterpart Application PCT/US2012/061590.
Sandra Dominikus, et al. "Passive RFID Technology for the Internet of Things", Internet Technology and Secured Transactions (CITST), 2010 International Conference for, IEEE, Piscataway, NJ, Nov. 8, 2010, pp. 1-8; XP031842128, ISBN: 978-1-4244-8862-9.

* cited by examiner

*Primary Examiner* — Steven Lim
*Assistant Examiner* — Sisay Yacob

(57) ABSTRACT

A host server may optimize configurations of a set of readers under its control. The server assigns a multicast address to each reader in the set. Once connected, the server sends a multicast message to each reader assigned to the multicast address or to each reader within a given address range. Information in the multicast message is used for configuring or managing polling operations of each reader assigned to the multicast address or each reader within the given address range.

18 Claims, 3 Drawing Sheets

METHOD AND APPARATUS FOR OPTIMIZING MANAGEMENT AND CONFIGURATION OF RADIO FREQUENCY IDENTIFICATION READERS

FIELD OF THE DISCLOSURE

The present disclosure relates generally to managing Radio Frequency Identification (RFID) readers and more particularly to optimizing management and configuration of multiple RFID readers by a single host system.

BACKGROUND

Radio Frequency Identification (RFID) systems have become increasingly prevalent and can be used to identify people as well as objects. An RFID system may be configured to include at least one RFID reader (also referred to herein as reader) and one or more RFID tags (also referred to herein as tags). The RFID reader transmits and receives radio frequency (RF) signals from one or more tags within a range defined by one or more parameters. For example, the reader's RF range or coverage area may be defined based on an antenna configuration on the reader, the RF characteristics of the area around the reader (e.g. empty space vs. metal obstructions), or the transmit power of the reader. RFID tags are typically compact and are attachable to objects. RFID tags are configured to include an integrated circuit for storing and processing information, modulating and demodulating RF signals, and performing other specialized functions. RFID tags may include an antenna in communication with the integrated circuit, wherein the antenna is used for transmitting RF signals to and receiving RF signals from the RFID reader. An RFID tag is usually tuned to a particular frequency.

In some implementations, RFID readers may be distributed throughout an establishment to provide RF coverage for areas where tagged items may be located. It should be noted that the coverage areas assigned to RFID readers may overlap. Each reader periodically polls/interrogate the RFID tags within its coverage area, i.e., each reader sends RF signals to and receives RF signals from tags within its coverage area. Each reader may be mounted to a fixed location and connected to a network via wired or wireless connections. RFID readers may also be managed and controlled by one or more host systems. A managing host system keeps track of each reader under its control. For example, the managing host system may direct a specific reader to interrogate tags in a predefined area. The managing host system is configured to keep track of a network status and network address of each reader under its control. Upon determining a reader's network address, for example the Internet Protocol (IP) address assigned to the reader, the managing host system establishes a direct connection with the reader via the IP address. Once connected, the managing host system may issue commands that are specific for each reader.

In addition to initially directing readers under its control to interrogate tags within predefined coverage areas, the managing host system may also have to reconfigure settings for one or more readers under its control. Hence, the managing host system must know the IP address for each reader to be configured or reconfigured in order for the managing host system to establish a direct connection to each reader via its known IP address. Once connected, the managing host system sends individual configuration and management commands directly to each reader via the reader's IP address. As the number of readers under the control of the managing host system grows, configuring and managing the readers controlled by the managing host system via individual commands may become burdensome.

Accordingly, a method is needed for optimizing management and configuration of multiple RFID readers by the managing host system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
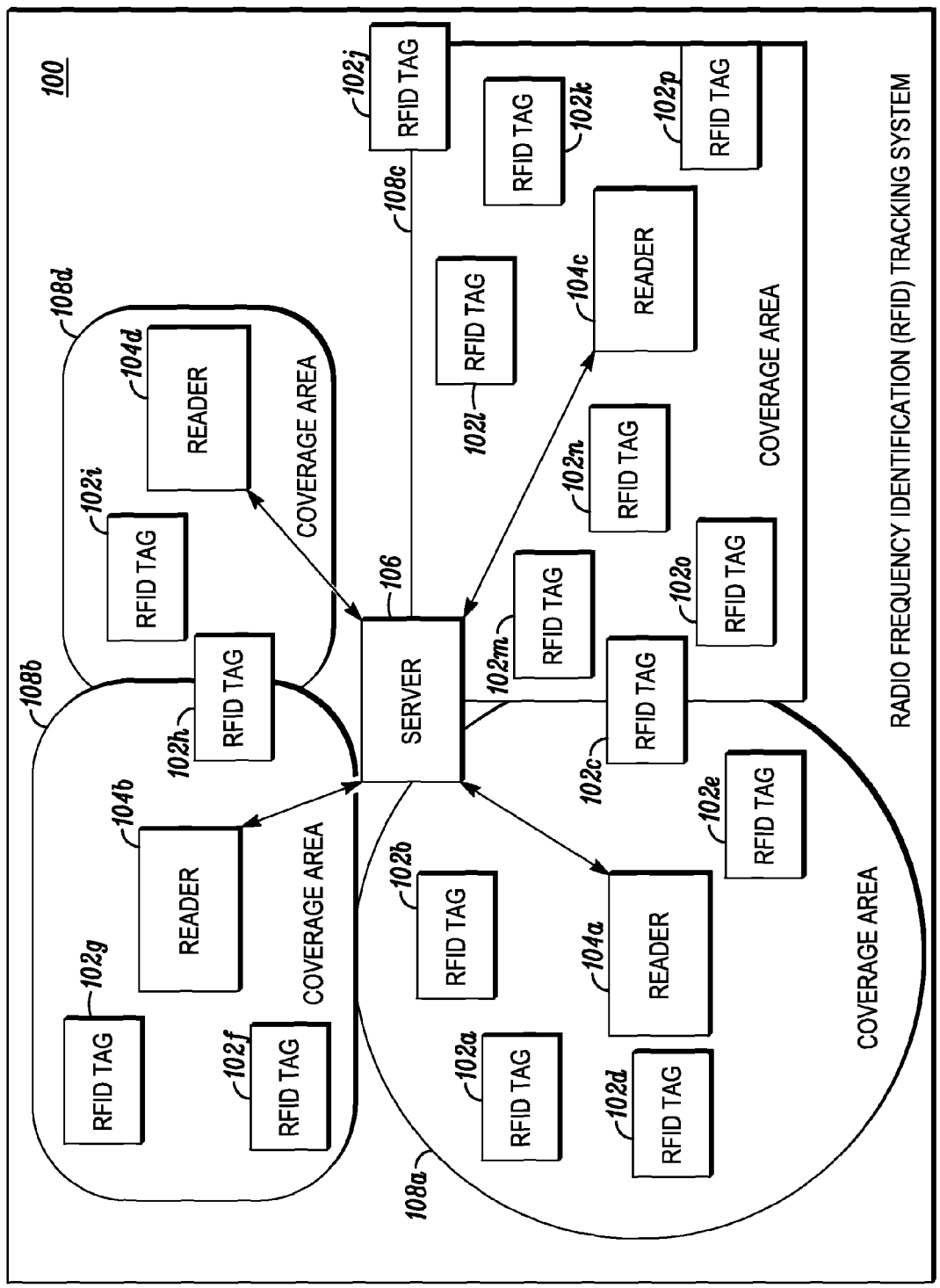
FIG. 1 is a block diagram of a Radio Frequency Identification (RFID) system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for optimizing configurations of a set of readers under the control of a host server. The server assigns a multicast address to each reader in the set. Once connected, the server sends a multicast message to each reader assigned to the multicast address or to each reader within a given address range. Information in the multicast message is used for configuring or managing polling operations of each reader assigned to the multicast address or each reader within the given address range.

FIG. 1 is a block diagram of a Radio Frequency Identification (RFID) system used in accordance with some embodiments. RFID system 100 includes RFID readers 104 (also referred to herein as readers 104), each of which is configured to send and receive radio frequency (RF) signals within a coverage area 108. Readers 104 may operate independently or may be coupled together to form a reader network. Each reader 104 is also configured to communicate with one or more RFID tags 102 (also referred to herein as tags 102), within its predefined coverage area. RFID tags 102 can be affixed or attached to one or more items in order to determine an inventory of items within an establishment. Each reader 104 may interrogate RFID tags 102 within its coverage area 108 by transmitting an interrogation signal to the RFID tags within the reader's predefined coverage area. RFID tags 102 within the reader's predefined coverage area may transmit one or more response signals to the reader in a variety of ways, including by alternatively reflecting and absorbing portions of the interrogation signal according to a time-based pattern or frequency.

Each RFID tag 102 conveys identifying information about the type of item to which the tag is attached or affixed so that an inventory determination can be quickly accomplished through RFID interrogation. It should be noted that RFID tags 102 may be affixed or attached to individual items or to a group of items. For example, a tag may be affixed or attached to one or more pallets with multiple items. RFID tags 102 can therefore provide information sufficient to be used in determining the types of items and the number of items present within the establishment so that different types of tag-to-location associations can be performed.

Upon receiving response signals from tags 102 within the reader's coverage area, each reader 104 is configured to obtain data, such as an identification number of each responding tag 102, from the response signals. Readers 104 then transmit data obtained from tags 102 to a host server 106. Server 106 may use data aggregated from one or more readers 104 to manage future operations and/or configurations of the readers.

Figure 2:
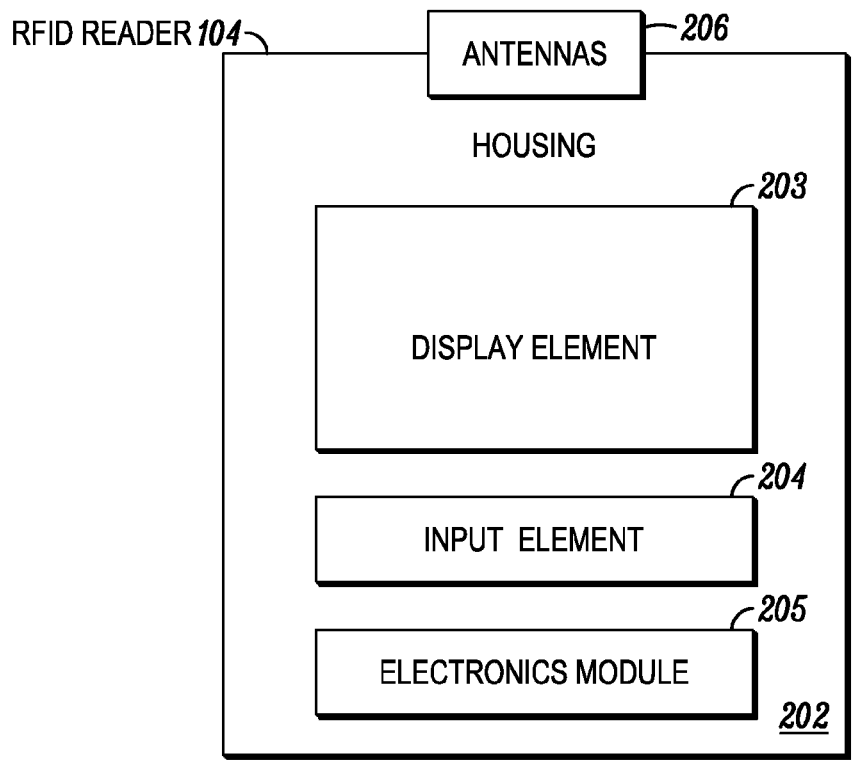
FIG. 2 is a block diagram of a RFID reader used in accordance with some embodiments.

FIG. 2 is a block diagram of a RFID reader used in accordance with some embodiments. RFID reader 104 generally includes a housing 202, a display element 203 that is visible from the outside of the housing 202, an input element 204 that is accessible from the outside of the housing 202, an electronics module 205 contained within the housing 202, and one or more RFID antenna 206 (which can be, but is not necessarily, contained within the housing 202). Input element 204 may be a keypad, a touch panel or other input/output elements. The display element 203 and input element 204 function as input/output elements during use of reader 104. It should be noted that in some cases reader 104 may not include input/output elements. In cases where reader 104 includes input/output elements, display element 203 and input element 204 can be coupled to electronics module 205 as necessary to support input/output functions in a conventional manner. Electronics module 205 may incorporate hardware components and software functionality of RFID reader 104. In some embodiments, electronics module 205 can be physically realized as an integrated component, board, card, or package mounted within the housing 202. Electronics module 205 may include one or more memory portions for storing instructions, wherein one or more of the memory portions are coupled to one or more processors for performing functions associated with RFID reader 104. Electronics module 205 can be coupled to the RFID antenna 206 using suitable techniques. For example, the electronics module 205 and the RFID antenna 206 can be connected via an RF cable and RF connector assemblies.

Figure 3:
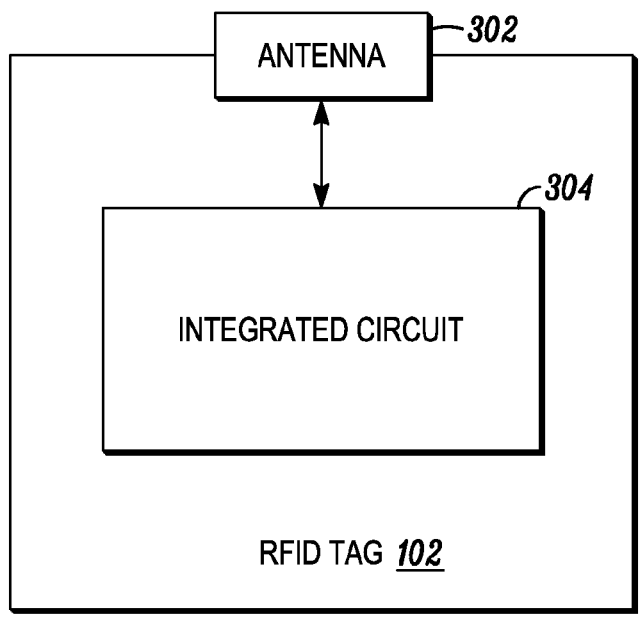
FIG. 3 is a block diagram of a RFID tag used in accordance with some embodiments.

FIG. 3 is a block diagram of a RFID tag used in accordance with some embodiments. RFID tag 102 includes an antenna 302 and an integrated circuit 304. Antenna 302 is configured to receive and transmit RF signals. Integrated circuit 304 is configured to store and process information. RFID tag 102 can be positioned within transmission range of the RFID reader 104. Accordingly, RFID tag 102 can receive an interrogation signal sent from RFID reader 104 with antenna 302. Integrated circuit 304 can perform one or more operations in response to receiving the interrogation signal, including modulating the interrogation signal. After processing the interrogation signal, RFID tag 102 can transmit a response signal to RFID reader 104 through antenna 302. Upon receipt of the response signal, RFID reader 104 may extract information from the response signal and transmit the extracted information to the central server.

To optimize configuration of readers under the control of server 106, in some embodiments, in addition to sending individual commands directly to each reader under its control and receiving direct responses from these readers, server 106 may use a one to many delivery method, i.e., transmit a single command to multiple readers on a network. During configuration using known protocols, such as Transmission Control Protocol/Internet Protocol (TCP/IP) protocol, specific readers may be associated with a multicast group and may therefore be assigned a multicast group IP address. Once connected with readers associated with the multicast group, server 106 may send a single command or message (multicast message) to the readers that are part of a multicast group. For example, when server 106 sends the multicast message to the multicast group IP address, network adaptors on readers assigned the multicast group IP address are configured to listen for (receive) commands/messages sent to the multicast group IP address. For a network adapter to receive the multicast message, the multicast group IP address assigned to the readers may be mapped to a hardware, or media access control (MAC), multicast address. Each network adapter listens for multicast messages addressed to this MAC-level address and passes the messages up to its operating system. Hence, by using multicasting protocols, such as TCP/IP protocol, server 106 may assign specific readers under its control to specific groups such that individual messages are sent to specific groups of readers for controlling and managing these groups of readers polling operations.

In some embodiments, the multicast message may be used to direct polling operations performed by specific groups of readers. For example, the multicast message may include information for instructing readers in specific multicast group(s) to begin or end polling operations within the readers' coverage areas. The multicast message may also be used to configure polling settings for each reader in the multicast group(s). For example, the multicast message may be used to direct polling intervals, i.e., to direct how long each reader in the multicast group is to wait before performing a subsequent poll. In another example, the multicast message may also be used to increase the interrogation length (the length of time the reader can send RF signals to and receive RF signals from tags) or increase the reader's transmit power in an attempt to receive RF signals from more tags. In another example, the multicast message may also be used to locate a specific tag. For example, server 106 could send the multicast message to readers in the multicast group(s) for those readers to locate a specific tag. The readers can also communicate to each other over multicast. For example, when one reader in the multicast group finds a requested tag, the reader can send a multicast message to other readers in the multicast group so that those readers can stop looking for the requested tag.

In some embodiments, server 106 may broadcast the multicast message to all readers under its control. Server 106 therefore transmits the multicast message to all readers within a given address range. In this case, the multicast message becomes a "broadcast" message and each reader 104 within the given address range of the broadcast message may listen for the broadcast message that can be heard by every network device within the given address range. By using the broadcast message that can be received by all readers within the given address range, server 106 can configure and manage the poll settings and/or operations of all readers under its control.

Figure 4:
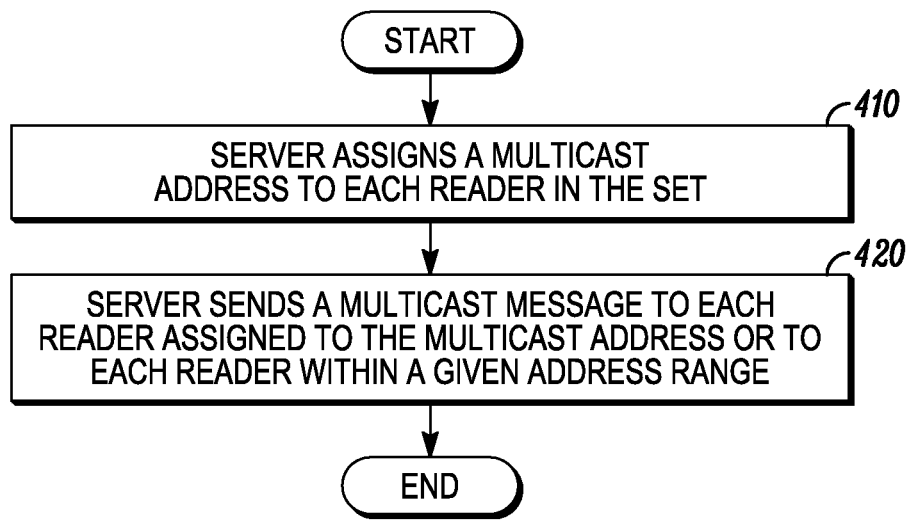
FIG. 4 is a flow diagram of a method of optimizing configurations of a set of readers under control of a host server in accordance with some embodiments.

FIG. 4 is a flow diagram of a method of optimizing configurations of a set of readers under control of a host server in accordance with some embodiments. In 410, the server assigns a multicast address to each reader in the set. In 420, the server sends a multicast message to each reader assigned to the multicast address or to each reader within a given address range. Information in the multicast message is used for configuring or managing polling operations of each reader assigned to the multicast address or each reader within a given address range.

Figure 5:
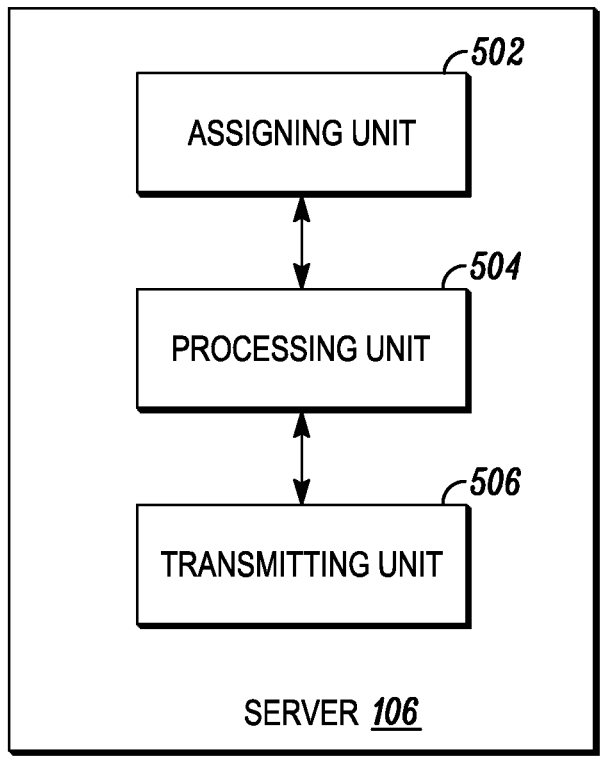
FIG. 5 is a block diagram of a server used in accordance with some embodiments.

FIG. 5 is a block diagram of a server used in accordance with some embodiments. Server 106 is configured to optimize configurations of a set of readers under its control. The server includes an assigning unit 502 that is configured to assign a multicast address to each reader in the set. The server also includes a processing unit 504 for configuring the multicast message to manage or configure polling operations performed by each reader assigned to the multicast address or each reader within the given address range. The server further includes a transmitting unit 506 that is configured to send a multicast message to each reader assigned to the multicast address or to each reader within a given address range. Information in the multicast message is used for configuring or managing polling operations of each reader assigned to the multicast address or each reader within a given address range.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for optimizing configurations of a set of radio frequency identification readers under control of a host server, the method comprising:

assigning, by the host server, a multicast address to each reader in the set;

sending, by the host server, a multicast message to each reader assigned to the multicast address or to each reader within a given address range, wherein information in the multicast message is used for configuring or managing interrogation operations of each reader assigned to the multicast address or each reader within a given address range to begin or end interrogation operations within a reader coverage area, wherein the multicast message includes commands for interrogation configuring settings used by each reader assigned to the multicast address or each reader within the given address range, and wherein the multicast message includes commands for directing each reader assigned to the multicast address or each reader within the given address range to locate a specific radio frequency identification tag that identifies information about the type of item to which the specific radio frequency identification tag is attached or affixed; and transmitting to the host server, by a reader receiving response signal from the specific radio frequency identification tag in response to the multicast message sent by the host server, data obtained from the specific radio frequency identification tag that includes information about the type of item to which the specific radio frequency identification tag is attached or affixed.

2. The method of claim 1, wherein assigning includes associating specific readers with a multicast group internet protocol address using a Transmission Control Protocol/Internet Protocol (TCP/IP) protocol.

3. The method of claim 2, wherein the multicast group internet protocol address assigned to the readers is mapped to a media access control (MAC) multicast address.

4. The method of claim 1, wherein the multicast message includes commands for directing interrogation intervals of each reader assigned to the multicast address or each reader within the given address range.

5. The method of claim 1, wherein the multicast message includes commands for increasing a transmit power of each reader assigned to the multicast address or each reader within the given address range.

6. The method of claim 1, wherein a network adaptor on each reader assigned to the multicast address is configured to receive the multicast message sent to the multicast address.

7. The method of claim 6, wherein the multicast address is mapped to a hardware multicast address and the network adapter is configured to receive multicast messages addressed to the hardware multicast address.

8. The method of claim 1, wherein the set of readers includes all readers under the control of the host server, wherein the multicast message is sent to all readers within the given address range.

9. The method of claim 1, wherein when a reader assigned to the multicast address finds the specific tag that reader sends another multicast message to other readers assigned to the multicast address or wherein that reader within the given address range sends another multicast message to other readers within the given address range so that those other readers can stop looking for the specific tag.

10. A host server configured to optimize configurations of a set of radio frequency identification readers under control of the host server, the host server comprising:
an assigning unit configured to assign a multicast address to each reader in the set;
a transmitting unit configured to send a multicast message to each reader assigned to the multicast address or to each reader within a given address range,
wherein information in the multicast message is used for configuring or managing interrogation operations of each reader assigned to the multicast address or each reader within a given address range to begin or end interrogation operations within a reader coverage area, and wherein the multicast message includes commands for directing each reader assigned to the multicast address or each reader within the given address range to locate a specific radio frequency identification tag that identifies information about the type of item to which the specific radio frequency identification tag is attached or affixed; and
wherein the host server is further configured to receive, from a reader receiving response signal from the specific radio frequency identification tag in response to the multicast message sent by the host server, data obtained from the specific radio frequency identification tag that includes information about the type of item to which the specific radio frequency identification tag is attached or affixed.

11. The host server of claim 10, further comprising a processing unit for associating specific readers with a multicast group internet protocol address using a Transmission Control Protocol/Internet Protocol (TCP/IP) protocol.

12. The host server of claim 11, wherein the multicast group internet protocol address assigned to the readers is mapped to a media access control (MAC) multicast address.

13. The host server of claim 10, further comprising a processing unit for configuring the multicast message to include commands for interrogation configuring settings used by each reader assigned to the multicast address or each reader within the given address range.

14. The host server of claim 10, wherein the multicast message includes commands for directing interrogation intervals of each reader assigned to the multicast address or each reader within the given address range.

15. The host server of claim 10, wherein the multicast message includes commands for increasing a transmit power of each reader assigned to the multicast address or each reader within the given address range.

16. The host server of claim 10, wherein the transmitting unit is configured to transmit the multicast message to a hardware multicast address, wherein a network adapter on each reader assigned to the multicast address is configured to receive multicast messages addressed to the hardware multicast address.

17. The host server of claim 10, wherein the assigning unit is configured to assign all readers under the control of the host server to the set of readers, wherein the multicast message is sent to all readers within the given address range.

18. The host server of claim 10, wherein when a reader assigned to the multicast address finds the specific tag that reader sends another multicast message to other readers assigned to the multicast address or wherein that reader within the given address range sends another multicast message to other readers within the given address range so that those other readers can stop looking for the specific tag.

\* \* \* \* \*